US008385835B2

(12) United States Patent
Lemmon

(10) Patent No.: US 8,385,835 B2
(45) Date of Patent: Feb. 26, 2013

(54) SYSTEMS AND METHODS FOR CONDUCTING EMI SUSCEPTIBILITY TESTING

(75) Inventor: Andrew N. Lemmon, Collierville, TN (US)

(73) Assignee: Federal Express Corporation, Memphis, TN (US)

(*) Notice: Subject to any disclaimer, the term of this patent is extended or adjusted under 35 U.S.C. 154(b) by 271 days.

(21) Appl. No.: 12/775,514

(22) Filed: May 7, 2010

(65) Prior Publication Data

US 2010/0283481 A1 Nov. 11, 2010

Related U.S. Application Data

(60) Provisional application No. 61/213,121, filed on May 8, 2009.

(51) Int. Cl.
*H04B 17/00* (2006.01)

(52) U.S. Cl. ................... 455/67.11; 455/67.14; 455/423

(58) Field of Classification Search ............... 455/67.11, 455/67.14, 423

See application file for complete search history.

(56) References Cited

U.S. PATENT DOCUMENTS 7,643,965 B2 * 1/2010 Zhang ........................... 702/191
7,932,864 B2 * 4/2011 Zhu et al. ...................... 343/702

FOREIGN PATENT DOCUMENTS

JP 2005-283225 * 10/2005
JP 2005283225 10/2005

OTHER PUBLICATIONS

PCT International Search Report and PCT Written Opinion from the International Searching Authority for corresponding PCT application PCT/US2010/033855 mailed Nov. 5, 2010 (8 pages total).

* cited by examiner

*Primary Examiner* — Tuan H Nguyen
(74) *Attorney, Agent, or Firm* — Finnegan, Henderson, Farabow, Garrett & Dunner, LLP

(57) ABSTRACT

System and methods for performing EMI susceptibility testing of a device is disclosed. A system may include an EMI generation unit that includes a plurality of EMI generating devices, where each EMI generating device generates EMI having substantially similar characteristics relative to EMI generated by other EMI generating devices in the system. Each EMI generating device is controlled by a controller that is configured to emulate at least partly a live cellular network.

19 Claims, 6 Drawing Sheets

SYSTEMS AND METHODS FOR CONDUCTING EMI SUSCEPTIBILITY TESTING

CROSS RELATED TO RELATED APPLICATIONS

This application is based upon and claims the benefit of priority from U.S. Provisional Application No. 61/213,121 to Lemmon filed on May 8, 2009, which is incorporated in its entirety by reference herein.

FIELD OF THE INVENTION

This disclosure relates to systems and methods for evaluating the susceptibility of electronic devices to electromagnetic interference (EMI). In particular, this disclosure relates to systems and methods for determining the susceptibility of a device to EMI generated by wireless devices such as, for example, cellular telephones.

BACKGROUND OF THE INVENTION

Most electronic devices emit electromagnetic radiation as a by-product of electrical and magnetic activity in the device during operation. These electromagnetic emissions from one device can interfere with the operation of other devices, causing potential problems. This interference in the electrical circuit of one device due to the electromagnetic radiations emitted by another device is termed electromagnetic interference (EMI). Any device containing electronic circuitry can produce EMI. Additionally, the presence of a radio transmitter within an electronic device dramatically increases emissions that can potentially cause interference, since the intentional emissions created by a radio transmitter are generally several orders of magnitude higher than the emissions produced by a non-transmitting device. EMI may interrupt, obstruct, or otherwise degrade or limit the effective performance of an affected electronic device. In some cases, the affected electronic device may be a device that performs a safety-related or other critical function, such as an electronic control system in an airplane.

The increasing use of personal wireless devices, such as cellular phones, in recent years has given rise to several safety concerns due to the risk of electromagnetic interference to electronic components of commercial aircraft. For example, modern commercial aircraft contain many electronic systems used in various communication, navigation, and system control functions. Some of these systems are wireless devices which intentionally transmit and receive electromagnetic signals at specific frequencies. If a cellular phone is operated within the airplane, the cellular phone may also transmit and receive electromagnetic signals. Depending upon the transmission characteristics of the cellular phone, the cellular phone may create EMI in one of the frequency bands used by aircraft systems, thereby compromising the normal operation of such systems. This concern has resulted in federal regulations prohibiting the operation of cellular phones and other personal electronic devices aboard airplanes and guidelines for evaluating aircraft systems to test their susceptibility to EMI.

Current employed methods for testing the susceptibility of electronic devices to EMI involve the use of a continuous wave (CW) signal generator to generate high levels of EMI within a specific frequency range. To test the susceptibility of a device to EMI generated by a cellular phone, EMI within the frequency range emitted by the phone will have to be created by the CW generator. However, the frequencies used by cellular phones are restricted and licensed by the FCC to local cellular network operators. The use of a CW signal generator at high power levels within these frequency bands is equivalent to the use of a cellular "jammer," and is unlawful in the United States. Additionally, the EMI signals generated by a CW signal generator do not closely represent the type of EMI produced by a cellular phone. Cellular phones produce EMI characterized by short pulses at irregular intervals. A CW signal generator may not be able to accurately reproduce this type of EMI.

To truly characterize the susceptibility of an electronic device to cellular-phone-generated EMI, the device should be subjected to EMI of the type emitted by cellular phones, and the performance of the device evaluated. To ensure that a mission critical system will function properly in a worst-case scenario, the system should be tested while subjected to an unusually high level of EMI which retains the essential timing and waveform characteristics of the EMI produced by cellular phones. Embodiments of the invention described in this document include a system and a method for subjecting an electronic device to a particular form of EMI, namely, the type of EMI generated by cellular phones. This system is useful for the purpose of characterizing the susceptibility of electronic equipment to the specific levels and frequencies of EMI produced by modern cellular phones.

Although the systems described in this document have been configured to analyze the susceptibility of electronic devices to the type of EMI characteristic of cellular telephones, it is contemplated that embodiments of the invention may be broadly used to analyze the susceptibility of a device to any type of EMI. For example, systems based on the current disclosure may be used to evaluate the susceptibility of any type of industrial, defense, or medical equipment to interference from any EMI producing device.

SUMMARY OF THE INVENTION

System and methods for performing EMI susceptibility testing of devices are disclosed. A system, according to one embodiment of the invention, includes an EMI generation unit that includes a plurality of EMI producing devices. Each EMI producing device in the EMI generation unit may generate EMI that has substantially similar characteristics relative to other EMI producing devices in the unit. The EMI producing devices in the EMI generation unit may also be controlled by a single controller. In some embodiments, the EMI producing devices may be cellular handsets, and the cellular handsets may be controlled by a controller that may emulate a live cellular network.

In some embodiments, each of the cellular handsets in the EMI generation unit may include a SIM card. Each of these SIM cards may contain data that is substantially identical to the others. In some cases, the EMI generation unit may also include a plurality of signal splitters. In some of these cases, each of the plurality of cellular handsets may be electrically coupled to a signal splitter such that a signal emitted by a cellular handset is divided into multiple components. One or more of these components may be directed to a cellular-band antenna and at least one other component may be directed to the controller through a length of coaxial cable. In some embodiments, this cable may incorporate a signal isolator that allows a signal to propagate in one direction only. In some embodiments, each of the cellular handsets may also include a signal isolator coupled to the antenna. These signal isolators may allow only outward transmission of signals through the antenna.

A disclosed embodiment of a method of performing EMI susceptibility testing may include operating multiple EMI generating devices using a controller to simultaneously produce EMI. The method may also include subjecting an electronic device under test to the EMI generated by the multiple EMI generating devices. The EMI generated by each of the multiple EMI generating devices may be substantially similar to each other.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Figure 1:
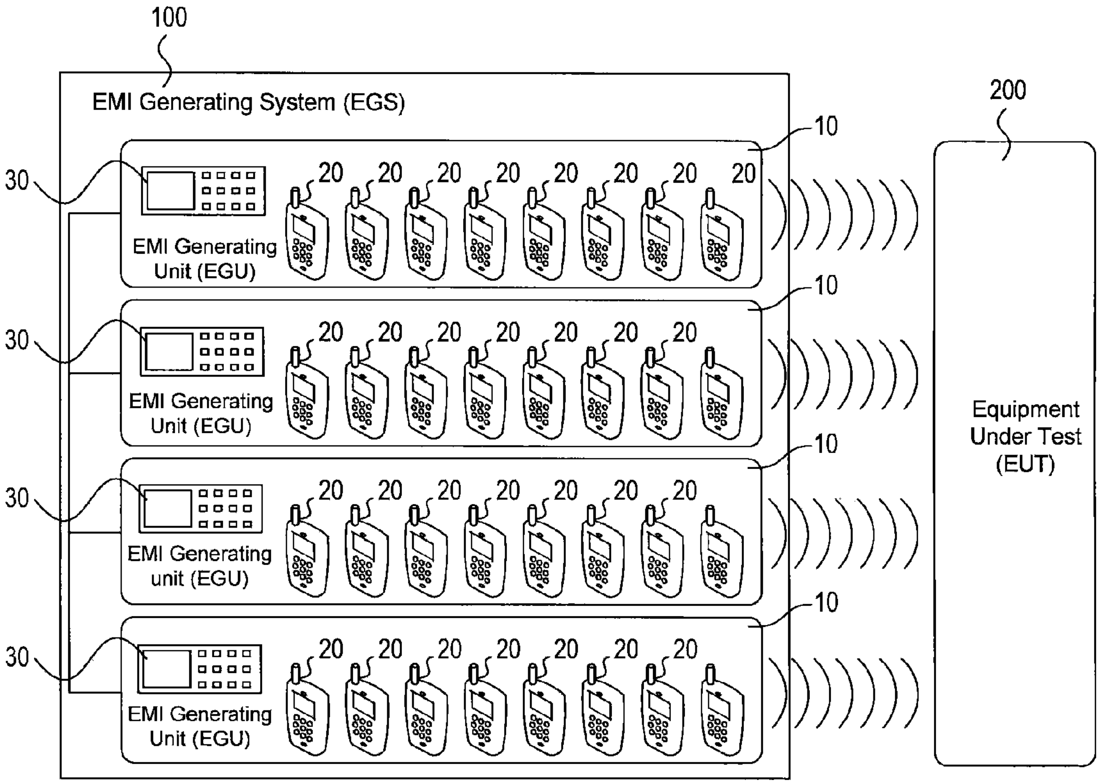
FIG. 1 is a schematic illustration of an EMI generation system (EGS) according to an embodiment of the current invention.

Embodiments of the current invention include a system and methods for subjecting an electronic system (referred to herein as the equipment under test or EUT) to a high-level of EMI by combining the output from multiple EMI producing devices. In an exemplary embodiment used to describe the invention, these multiple EMI producing devices are cellular phones. However, in general, the EMI producing devices may be any device that produces EMI. An overview of the system design, according one embodiment of the invention, is illustrated in FIG. 1. The system of FIG. 1 is composed of the equipment under test (EUT) 200 subjected to EMI from an EMI generating system 100. The EMI generating system 100 includes a series of EMI generation units (EGU) 10, each of which consists of a bank of eight cellular phones 20 and an EGU control device 30. Although the exemplary EMI generating system 100 shown in FIG. 1 includes four EGUs 10 with eight cellular phones 20 each (representing a total of 32 cellular phones), the EMI generating system 100 can be scaled in order to produce higher or lower levels of EMI with the addition or removal of EGUs 10 or cellular phones 20. There is no known theoretical limit to the number of cellular phones 20 or EGUs 10 which can be combined to create an EMI generating system 100.

The system of FIG. 1 is based on the principle that co-located wireless transmitters acting in unison can collectively create a source of EMI which is greater (for example, in amplitude) than the EMI produced by each individual transmitter. In theory, the net EMI produced by a system which comprises multiple individual transmitters may be roughly equivalent to the sum of the EMI produced by each individual transmitter if (1) the antenna for each transmitter is located proximate the same point in space, (2) the antenna for each transmitter is oriented and aligned in the same direction, (3) each transmitter transmits at the same frequency, and (4) the output of each transmitter is time-synchronized. However, practically, in a system comprised of a collection of individual transmitters, these four conditions may not be met perfectly. Additionally, a practical system may incur loss of EMI, due to absorption, reflection, and/or scattering resulting from environmental conditions. As a result, the net EMI produced by an EMI generating system 100 which includes multiple cellular phones 20 may be less than the sum total of the EMI produced by each individual cellular phone 20.

A practical system may, however, be approximated as a linear function of the number of active transmitters, with a scaling factor to account for the losses inherent in the system. This conclusion was corroborated by empirical testing in laboratory conditions. During empirical testing with an EMI generating unit made up of multiple transmitters, it was observed that if each transmitter transmits at the same frequency, and the outputs of the transmitters are precisely time-synchronized, then the net EMI produced by the EMI generating unit was a linear function of the number of transmitters in the EMI generating unit. In the EMI generating system 100 of FIG. 1, these two conditions are achieved in each EGU 10 by using the EGU controller 30.

Empirical testing with multiple transmitters also showed that if the antennas for all transmitters are positioned close to one another, the error introduced due to the difference in spatial location of the individual antennas is not significant. Since the net EMI produced by EGU 10 can be approximated as a linear function of the number of cellular phones 20 in EGU 10, any desired level of EMI can be produced by a predetermined number of synchronized cellular phones 20. For example, a level of EMI equivalent to five times the EMI produced by a single cellular phone 20 may require an EGU 10 which includes ten cellular phones 20.

Figure 2:
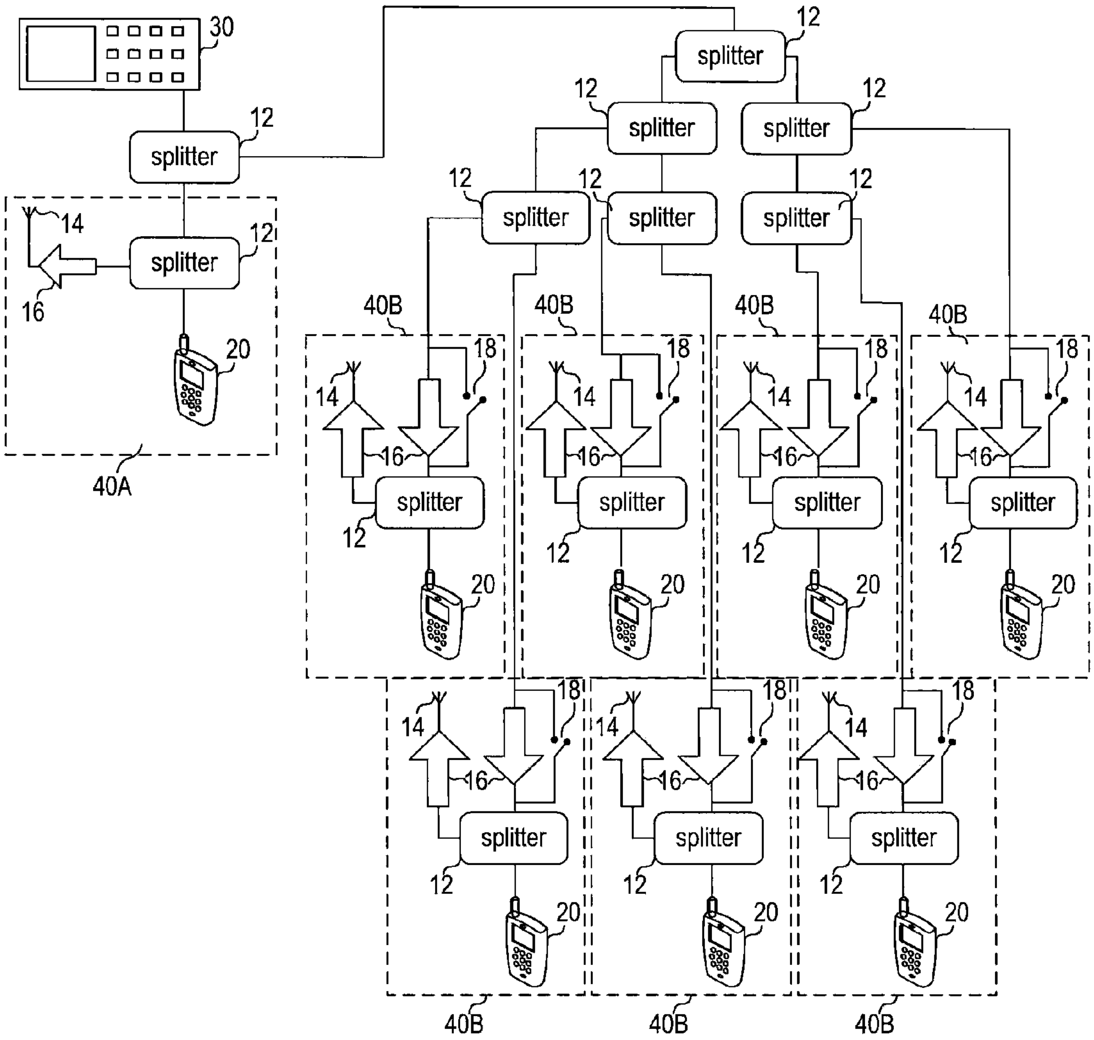
FIG. 2 is a schematic illustration of the internal design of an EMI generation Unit (EGU) included in the EGS of FIG. 1, according to an embodiment of the current invention.

FIG. 2 is a schematic illustration of the internal design of a single EGU 10 according to an embodiment of the invention. EGU 10 of FIG. 2 is controlled by EGU controller 30. In the embodiment of FIG. 2, EGU controller 30 is a commercially available or a custom made radio communication testing system terminal, referred to as a “call box” in the cellular phone testing field. The call box can emulate a portion of the functionality of a cellular base station and can communicate with a cellular phone 20 via any of the standard cellular communication protocols (GSM, CDMA, etc). Call boxes are typically used by cellular handset manufacturers to test the handset during manufacturing. These tests may include verification of basic protocol functions or detailed analysis of transmitter and receiver performance for quality assurance purposes. For a cellular handset to transmit any signals, it must first sense the presence of cellular network infrastructure. During handset testing, a call box is utilized to simulate the presence of a cellular network so that desired analyses can be performed on the handset without associating the EUT with any live cellular network infrastructure. This provides an isolated test environment and prevents any malfunctions of the EUT from negatively impacting paid subscribers on the live cellular network.

In this application, use of a call box allows the transmission features of cellular phone 20 to be determined entirely by EGU 10 in order to maximize EMI generation by the cellular phone 20. When a cellular phone 20 is connected to a live cellular network, the user has no control over a number of transmission features of the phone, since these features are automatically selected based on interaction of the phone with the network. For example, modern cellular phones have an adaptive transmit power feature by which the power level of the phone is dynamically controlled by the cellular network. As a result of this feature, a phone connected to a live wireless network automatically transmits at a higher power at a remote location where the network signal strength is low and at a lower power at a location where the network signal strength is high. Such a feature, though convenient for the intended usage model, poses a problem for the application of EMI susceptibility testing. Since the transmission power of the cellular phone 20 cannot be selected by the user, an EUT 200 in a laboratory cannot be subjected to varied levels of EMI from a cellular phone 20 (to test its susceptibility to EMI) without transporting the EUT 200 and the cellular phone 20 to regions of different signal strengths. An EGU controller 30 alleviates this problem by providing a means by which a technician can selectively increase the EMI emission of the cellular phone 20. It should be emphasized that, although a call box is used as EGU controller 30 in the exemplary embodiment of the invention described herein, in general, any EGU controller 30 that may be used to control the EMI producing devices used in the EGU 10 may be used as the EGU controller 30.

Two exemplary call boxes that are commercially available include the Rhode & Schwarz CMU-200 Universal Radio Communication Tester, and the Agilent 8960 Series 10 Wireless Communications Test Set. However, these commercially available call boxes are designed to interact with and control only one cellular phone 20 at a time, since that is all that is required for the purpose of cellular phone unit testing and quality assurance. However, for the purpose of creating an EMI generation system, these call boxes are not ideally suited since one call box would be required for each cellular phone. Thus, if a given EMI susceptibility analysis test requires the simultaneous use of fifty cellular phones 20, this test would require the use of fifty call boxes. From a practical standpoint, the use of fifty call boxes may be impractical based at least on cost. The layout of EGU 10 of FIG. 2 allows a single call box (EGU controller 30) to control multiple cellular phones 20 at the same time. This layout will be explained further in subsequent paragraphs.

Any type of commercially available GSM cellular phone that has an accessible antenna connector may be used as cellular phone 20 in the EGU 10 of FIG. 2. This antenna connector of cell phone 20 is connected to a signaling interface of EGU controller 30. In order to enable EGU controller 30 to control multiple cellular phones 20, each cellular phone 20 EGU 10 includes an identical subscriber identity module card or a SIM card. Identical SIM cards are not typically commercially available. In practice, SIM cards are generally distributed by a cellular network operator and are pre-configured to uniquely identify each individual SIM card to the cellular network for billing and other purposes. That is, these commercially available SIM cards are not identical, and therefore, cannot be used in cellular phones 20 of EGU 10.

In order to make the SIM cards used in cellular phones 20 of EGU 10 identical, a process of cloning a SIM card was employed. In the SIM card cloning process, international mobile subscriber identity or IMSI data (which is a unique number stored in a SIM card) and encryption data are extracted from one SIM card and copied to multiple blank SIM cards to produce multiple identical copies of the original SIM card. These SIM cards are then used in the cellular phones 20 of EGU 10. Since the process of cloning a SIM card is known in the art (see for example, http://www.kung-foo-.com.ar/share/Special_Edition_2002_SIM_Cloning.pdf), details of the cloning process is not included herein. In this evaluation, the cloning of SIM cards is performed only to satisfy the condition that EGU 10 be composed of identical cellular phones 20 from a GSM perspective.

In order for EGU controller 30 to control multiple cellular phones 20, a physical conductive path must be maintained between EGU controller 30 and each cellular phone 20 of EGU 10. Additionally, the electromagnetic signals produced by each cellular phone 20 must also be routed to an antenna 14 in order for the device to efficiently generate EMI. The signal splitters 12 of EGU 10 are used to divide the radio signal from each cellular phone 20 into two components, one of which is routed to EGU controller 30 and the other of which is routed to the antenna 14. These signal splitters 12 allow a single EGU controller 30 to control and coordinate the EMI emissions from multiple cellular phones 20 of EGU 10. A signal splitter is a passive electronic device which accepts an input signal and delivers multiple output signals with specific phase and amplitude characteristics. Any commercially available signal splitter may be used as signal splitter 12 of EGU 10. In the exemplary embodiment developed for evaluation, signal splitter model number ZAPD-2-21-3W from Mini-Circuits was used for each signal splitter 12.

EGU 10 of FIG. 2 also includes a set of signal isolators 16. A signal isolator is a passive electronic component which allows the propagation of a radio-frequency signal in one direction only. It is the radio-frequency equivalent of a one-way hydraulic valve. In EGU 10, the signal isolators 16 are used to prevent the signals emitted by cellular phones 20 from reaching EGU controller 30 or each other. The reason for this restriction will be explained in subsequent paragraphs.

Any commercially available signal isolator with an appropriate frequency response may be used as signal isolator 16 of EGU 10. Many commercially available signal isolators are only effective across a small range of frequencies. GSM cellular phones, however, are capable of operation across a broad band of frequencies. This broad band of frequencies may be roughly grouped into four bands: 850 MHz, 900 MHz, 1800 MHz, and 1900 MHz. As a result, two variants of signal isolators may be required for EGU 10 to function properly across all available cellular bands. For the 850 MHz and 900 MHz bands, one suitable commercially available isolator is the DiTom Microwave model number D3I0810S. This signal isolator has an operational frequency range of 800-1000 MHz. For the 1800 MHz and 1900 MHz bands, one suitable commercially available isolator is the DiTom Microwave D3I1722S. This signal isolator has an operational frequency range of 1700-2200 MHz.

A set of coaxial cables may be used to provide the interconnection between various components in FIG. 2. During typical use of a call box to test a cellular handset, an antenna is coupled to the call box and communication between the call box and the cellular handset is performed wirelessly. However, in this application, the communication between EGU controller 30 and each of cellular phones 20 must be closely regulated in order for the system to function properly. Therefore, communication between EGU controller 30 and each of the cellular phone 20 is accomplished through a network of coaxial cables. Although any coaxial cable may be used for this purpose, an exemplary cable is an RG-316DS cable with standard SMA terminations.

Figure 3:
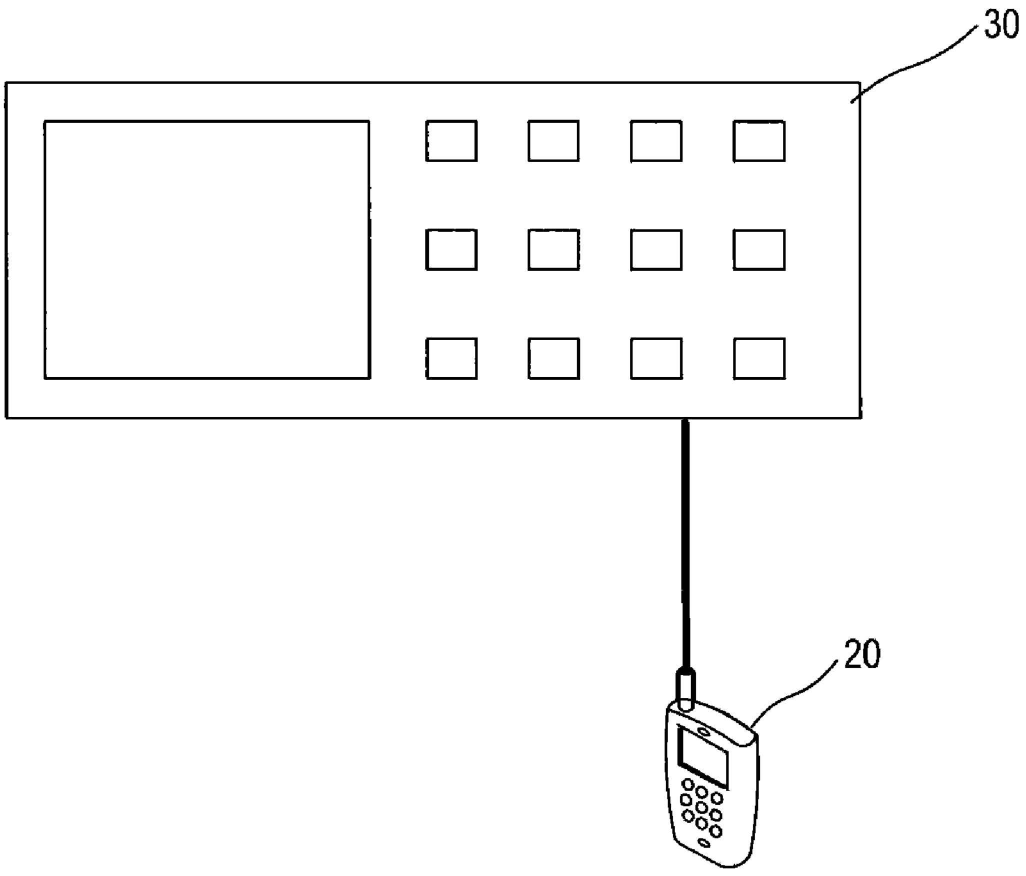
FIG. 3 is a schematic illustration of an EGU building block according to an embodiment of the current invention.

To explain the operation of the system of FIG. 1, the interaction between EGU controller 30 and a single cellular phone 20 is first described. FIG. 3 illustrates EGU controller 30 connected to a cellular phone 20 with a coaxial cable. While the arrangement of the components inside an EGU 10 of FIG. 1 is more complicated than the arrangement shown in FIG. 3, the configuration of FIG. 3 forms a fundamental building block of an EGU 10 of FIG. 1.

Figure 4:
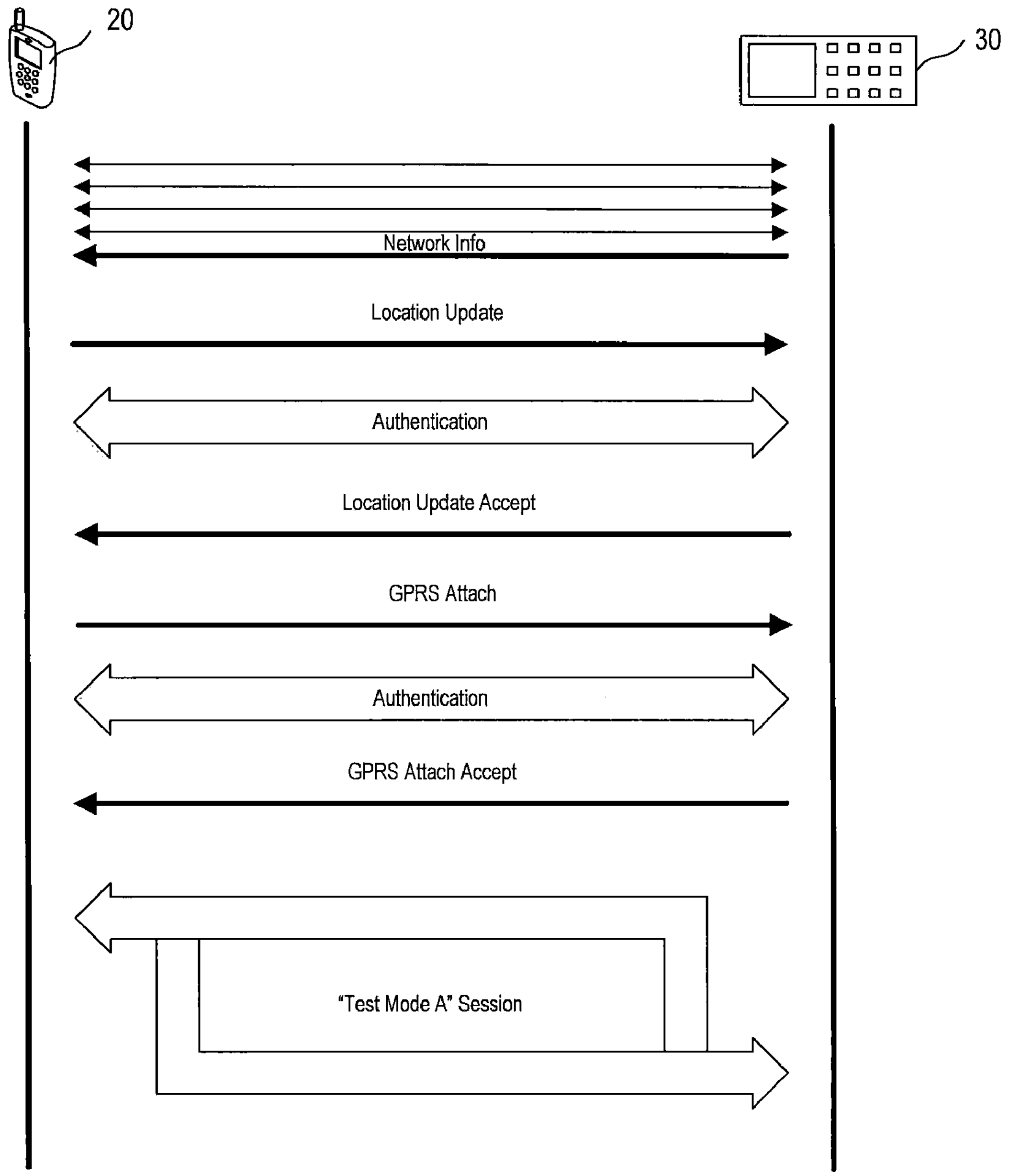
FIG. 4 is an illustration of the communication between the cellular phone and EGU controller of FIG. 3 during an authentication procedure according to an embodiment of the current invention.

Although the call box used as EGU controller 30 of FIG. 1 is capable of performing a variety of test functions, only one call box test function (called Test Mode A) is used in its application as EGU controller 30. The communication between EGU controller 30 and cellular phone 20 during this test function is illustrated in FIG. 4. Although EGU controller 30 is described as performing Test Mode A of a call box, any test mode that may support simultaneous EMI generation by multiple cellular phones 20 may be applied. While cellular phone 20 is connected to EGU controller 30, the EGU controller emulates all the functions of a live cellular network, and the cellular phone 20 does not know that it is communicating with EGU controller 30 instead of a live cellular network.

In normal usage, when a cellular handset is initially powered up, the handset begins monitoring the available GSM channels for network presence. When the presence of a network is detected, the handset synchronizes with the network and subsequently notifies the network of its presence. The ensuing authentication query and response is used to ensure that the device's SIM card represents a valid subscriber in good standing before the device is permitted to join the network. After this authentication procedure completes, the handset is considered registered at the GSM layer of the cellular network. In order to initiate the desired test function, the handset should be not only registered with the GSM network, but should be additionally operating under the provisions of the packet data service offered by the network, called the General Package Radio Service (GPRS). In order to activate this service, the cellular handset issues a GPRS attach request. This action triggers a second-level authentication procedure which is used to ensure that the device's SIM card is authorized to access the GPRS service. After this authentication procedure is completed, the handset is considered attached to the GPRS service on the network In this test scenario, cellular phone communicates and attaches to EGU controller 30 in the same manner as a cellular handset communicates and attaches with a cellular network in normal usage. The EGU controller 30 may continuously broadcast network information on the Broadcast Control Channel (BCCH) in the same fashion as a standard base station of a live cellular network. After cellular phone 20 identifies and synchronizes with the BCCH, the cellular phone 20 sends a "location update" notification to EGU controller 30 to inform the controller of its presence. Subsequent authentication communications between EGU controller 30 and cellular phone 20 validates and attaches cellular phone 20 to the GPRS service of EGU controller 30.

After the attachment process completes, EGU controller 30 invokes the test function, Test Mode A, of the call box. When this test function is initiated, EGU controller 30 sends a test packet to the cellular phone 20. This data packet triggers a response packet from cellular phone 20 to EGU controller 30. This back-and-forth communication proceeds until EGU controller 30 terminates the test session or until cellular phone 20 stops responding to the test packets. When cellular phone 20 is operating under an active Test Mode A session, cellular phone 20 continuously transmits response data packets to the EGU controller 30. This continuous transmission from cellular phone 20 results in the generation of EMI. However, in the simplified system depicted in FIG. 3, this EMI is contained in the coaxial cable between cellular phone 20 and EGU controller 30.

Figure 5:
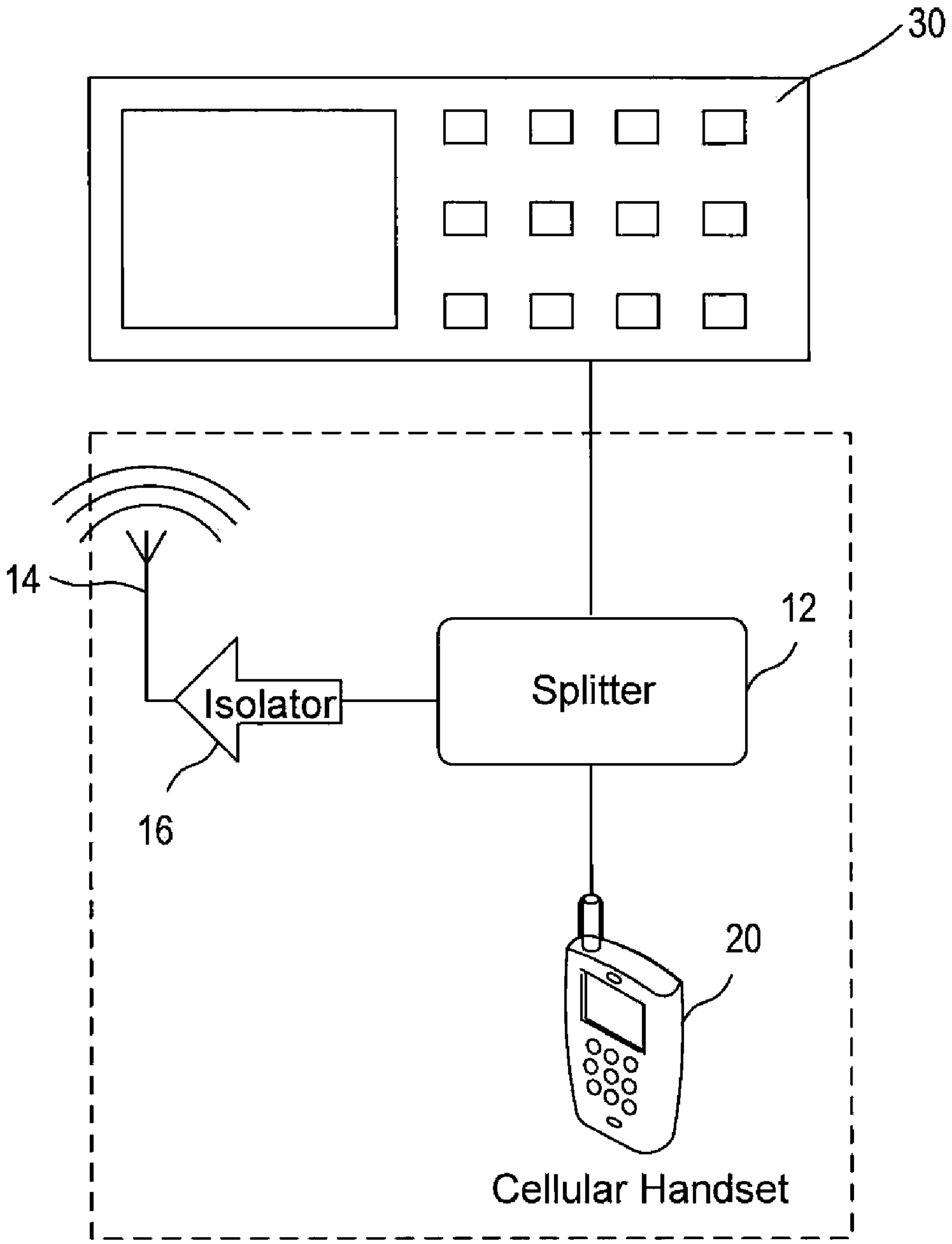
FIG. 5 is a schematic illustration of an EGU building block according to an embodiment of the current invention.

In order to allow the EMI to propagate into air, the hardware arrangement of FIG. 3 is modified. This modification is illustrated in FIG. 5. In this case, a signal splitter 12 between cellular phone 20 and EGU controller 30 allows a portion of the signal in the coaxial cable to be routed to attached antenna 14. An isolator 16 is also coupled to antenna 14 to allow only outward transmission of the signal from antenna 14. The presence of isolator 16 prevents cellular phone 20 from receiving signals from nearby live cellular networks, which could interrupt the Test Mode A session. The arrangement depicted in FIG. 5 is suitable from an EMI testing standpoint because cellular phone 20, under Test Mode A, now functions as a continuous source of EMI. EUT 200 of FIG. 1 may now be subjected to these EMI emissions for the purpose of susceptibility analysis.

Having described the operation of the basic building block of EGU 10 in FIG. 5, the overall operation of EGU 10 of FIG. 1 will now be described. EGU 10 of FIG. 1 may include a combination of the building block of FIG. 5 and an additional feature. This feature relates to circumventing a call box's limitation of communicating with only one cellular handset at any given time. As described previously, this limitation results from the fact that a call box is a commercial special-purpose test equipment which is only designed for unit-level evaluation of cellular handsets. In order to circumvent this limitation, EGU 10 may be configured in a in a manner suitable for controlling multiple cellular phones 20 without causing call box malfunction.

Figure 6:
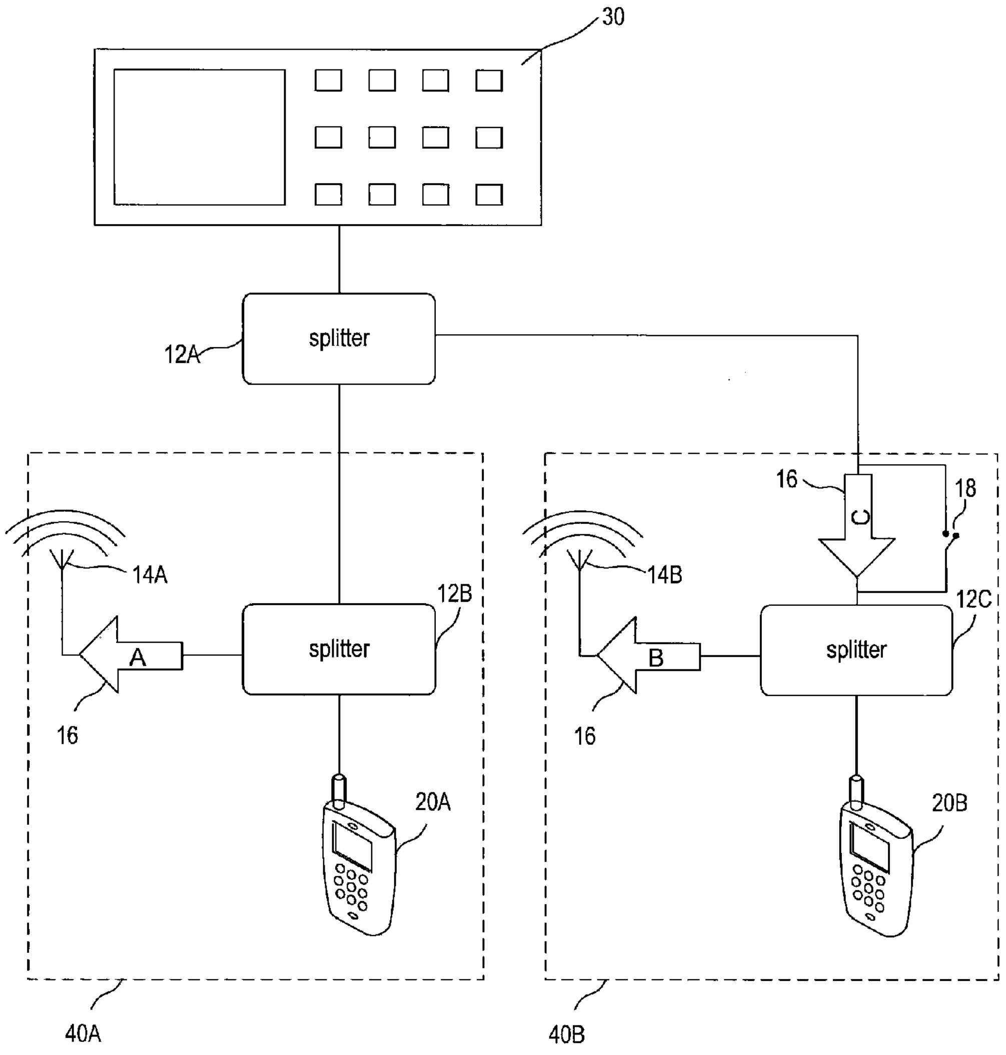
FIG. 6 is a schematic illustration of a simplified EMI generation unit according to an embodiment of the current invention.

FIG. 6 shows an exemplary simplified EGU 10' in which EGU controller 30 is connected to two cellular phones 20A and 20B. Simplified EGU 10' of FIG. 6 includes EGU controller 30 coupled to a primary subsystem 40A with cellular phone 20A and a secondary subsystem 40B with cellular phone 20B. The primary and secondary subsystems 40A and 40B are interconnected together and connected to EGU controller 30 through signal splitter 12A using coaxial cables. Functionally, simplified EGU 10' of FIG. 6 fully represents the operation of EGU 10 of FIG. 1, since the only difference between EGU 10 of FIG. 1 and simplified EGU 10' of FIG. 6 is the addition of more secondary subsystems 40B.

The primary subsystem 40A shown in FIG. 6 corresponds to the basic building block described with reference to FIG. 5. Secondary subsystem 40B of FIG. 6 is identical to primary subsystem 40A except for the addition of isolator "C" in the path to EGU controller 30. A switch 18 is connected in parallel to isolator C. Switch 18 is normally in an open configuration thereby connecting isolator C in the path of the signal from secondary subsystem 40B to EGU controller 30. By closing switch 18, isolator C can be bypassed. Using switch 18, secondary subsystem 40B can be configured in one of two ways—with the switch closed (that is, isolator bypassed), or with the switch open (that is, isolator introduced). With switch 18 closed, cellular phone 20B of secondary subsystem 40B can communicate with EGU controller 30 bidirectionally. With switch 18 open, cellular phone 20B can only receive test packets from EGU controller 30, but response packets sent back to EGU controller 30 are blocked at isolator C.

In order to cause cellular phones 20A and 20B of both primary and secondary subsystems 40A and 40B to simultaneously generate EMI, each of these two cellular phones 20A and 20B must perform the authentication and attachment steps described earlier with reference to FIG. 4. Since EGU controller 30 communicates only with one device at a time, this procedure may be performed twice in succession (once for each subsystem). Additionally, for the authentication and attachment procedure to succeed, bidirectional communication between EGU controller 30 and the active cellular phone (20A or 20B) is required during this procedure. After the authentication and attachment process has completed for both cellular phones 20A and 20B, the EGU controller can initiate a Test Mode A session during which the signals from both cellular phones 20A and 20B are time-synchronized. Through empirical testing, it was discovered that, after synchronization, the response packets generated by each cellular phone 20A and 20B during the synchronized Test Mode A session were substantially identical except for small timing irregularities. The implication of this finding is that only one cellular phone (20A or 20B) needs to send response packets to EGU controller 30 in order to keep the test session active. This is the function provided by cellular phone 20A of the primary subsystem 40A. Cellular phone 20B of secondary subsystem 40B receives the same test packets as cellular phone 20A, but the response packets generated by the cellular phone 20B are blocked at isolator C. This prevents these response packets from reaching EGU controller 30. EGU controller 30 is thus prevented from becoming confused and suspending the Test Mode A session as a result of receiving an amalgamation of two individual test packet responses from cellular phones 20A and 20B.

To initiate the simplified EGU 10' of FIG. 6, both cellular phones 20A and 20B are powered off and EGU controller 30 is activated. Switch 18 is also closed to allow bidirectional communication between EGU controller 30 and cellular phone 20B. Cellular phone 20B is then powered on. After power on, cellular phone 20B follows the initiation procedure described with reference to FIG. 4. The initialization procedure of cellular phone 20B continues up through and including the receipt of the "GPRS Attach Accept" message from EGU controller 30. At this point, switch 18 is opened, to prevent communication from cellular phone 20B from reaching EGU controller 30 during subsequent procedures. The attachment status of EGU controller 30 is then cleared. Clearing the attachment status causes EGU controller 30 to act as though it is not connected to any cellular phone (20A or 20B). The attachment status may be manually cleared at EGU controller 30 or an automated procedure may be employed. Cellular phone 20A is then powered on, and the initiation procedure (of FIG. 4) is followed up through and including the receipt of the "GPRS Attach Accept" message from EGU controller 30. EGU controller 30 then initiates the Test Mode A session. Under Test Mode A, both cellular phones 20A and 20B receive test packets from EGU controller 30 and transmit response packets. However, due to the presence of Isolator C in secondary sub-system 40B, only the response packets generated by cellular phone 20A reach EGU controller 30.

In this scenario, bidirectional communication happens only between EGU controller 30 and cellular phone 20A because only the response packets from this cellular phone reach EGU controller 30. Therefore, EGU controller 30 operates as it normally would in a single handset Test Mode A session. However, since cellular phone 20B of secondary sub-system 40B also receives the test packets from EGU controller 30, this phone also transmits response packets which are emitted from antenna 14B. In this way, both the primary and secondary subsystems 40A and 40B are stimulated to generate EMI. Any number of secondary subsystems can be connected to EGU controller 30 in the same manner as shown in FIG. 6 to create a large EGU 10 as depicted in FIG. 1. As mentioned earlier, the number of cellular phones 20 that may be coupled together to create EGU 10 may depend on the desired strength of the EMI signal for evaluation of EUT 200. The operation of EGU 10 of FIG. 1 with multiple secondary systems 40B is identical to operation of EGU 10' described earlier, except that the initiation and attachment procedure is repeated for each secondary subsystem 40B. The primary subsystem 40A is initiated last.

An exemplary EGS 100 with four EGU's 10 having eight cellular phones 20 each was constructed and used to determine the EMI susceptibility of electronic systems within several types of FedEx aircraft. In this exemplary implementation, each EGU 10 was mounted on a rolling equipment cart, and positioned in an area within the aircraft where EMI vulnerability was suspected. EGU controller 30 was activated and the initiation and attachment procedure was carried out as described earlier. The aircraft systems were then exposed to predetermined levels of EMI. Standard avionics diagnostic procedures were then carried out to determine the impact of the resulting EMI on each electronic system. During this test procedure, the exemplary EMI generation system provided verification that the systems and methods described in this disclosure are viable and capable of functioning as desired for the purpose of EMI susceptibility evaluation.

Any diagnostics procedure known in the art may be used to determine the impact of EMI on the electronic system. For instance, this diagnostic procedure may include an automated self-test procedure which may be part of the aircraft navigation and communication systems. The diagnostic procedure may also include manual manipulation of instrumentation controls according to published manual test procedures. Additionally, this diagnostic procedure may include attachment of test equipment to various on-aircraft sensors and antennas in order to simulate different flight and environmental conditions.

As compared to current methods employed for testing the susceptibility of electronic devices to EMI using CW signal generators, the EMI generating systems and methods of the current disclosure may have several advantages. First, unlike the CW system which may be affected by regulations against broadcasting in licensed frequencies, the EMI generating systems of the current disclosure may be unaffected since the EMI is generated by individual transmitters operating within limits authorized by the FCC. It is the combined effect of all the associated handsets which produces the desired level of EMI. However, in order to also satisfy the spirit of the FCC regulations, care must still be exercised to avoid this combined effect from causing harm to nearby live network resources. The EMI generated by the EMI generation system may also better represent the EMI signals generated by a cellular device since the EMI generation system uses actual cellular handsets to generate the EMI.

In the description above, one or more EGUs 10 with multiple individual cellular phones 20 coupled to a controller 30, are used to produce EMI of sufficient intensity to subject an EUT 200 to EMI susceptibility testing. However, it is also contemplated that, in some embodiments, some or all of these discrete components may be combined together to produce an integrated EMI generating component. For instance, in some embodiments, relevant components of multiple cellular phones and the controller may be combined to create one integrated EMI-producing component that may be used to perform EMI susceptibility testing. Additionally, although the current disclosure describes an application where EMI susceptibility testing is performed on aircraft components, the systems and methods of the current disclosure may be widely used to test the EMI susceptibility of any device.

I claim:

1. A system for performing EMI susceptibility testing, comprising:

a controller configured to emulate a live cellular network; and an EMI generation unit coupled to the controller, the EMI generation unit including a plurality of EMI generating devices, each EMI generating device being controlled by the controller to generate EMI, wherein characteristics of the EMI generated by each of the plurality of EMI generating devices are substantially similar, wherein each EMI generating device is a cellular handset.

2. The system of claim 1, wherein each of the cellular handsets includes a SIM card that contains substantially identical data as SIM cards of the other cellular handsets.

3. The system of claim 1, wherein the EMI generation unit includes a signal splitter.

4. The system of claim 3, wherein at least one EMI generating device of the plurality of EMI generating devices is electrically coupled to the signal splitter such that a signal emitted by the at least one EMI generating device is divided into multiple components, one component of the multiple components being directed to an antenna and another component being directed to the controller through a cable.

5. The system of claim 4, wherein the cable electrically connects the at least one EMI generating device to the controller through a signal isolator that allows signal propagation in one direction only.

6. The system of claim 5, wherein the cable includes a switch connected in parallel to the signal isolator.

7. The system of claim 4, wherein each EMI generating device of the plurality or EMI generating devices is wirelessly coupled to the controller through signal isolators, at least one signal isolator being configured to only allow outward transmission of signals through the antenna.

8. The system of claim 1, wherein the controller is a call box.

9. The system of claim 1, wherein each of the plurality of EMI generating devices are electrically coupled together using coaxial cables.

10. A method of performing EMI susceptibility testing of an electronic device, comprising:

operating multiple EMI generating devices using a controller to simultaneously produce EMI, wherein each EMI generating device is a cellular handset; and subjecting the electronic device to the EMI simultaneously generated by the multiple EMI generating devices, the EMI generated by each of the multiple EMI generating devices being substantially similar to each other.

11. The method of claim 10, wherein each cellular handset includes a SIM card that contains substantially identical data as SIM cards of the other cellular handsets.

12. The method of claim 10, further including blocking signals from at least some of the multiple EMI generating devices to the controller using signal isolators.

13. The method of claim 12, wherein blocking signals from at least some of the multiple EMI generating devices includes allowing bidirectional communication between the controller and only one of the multiple EMI generating devices.

14. The method of claim 10, wherein the controller includes a call box and operating the multiple EMI generating devices include running a test function of the call box on each of the multiple EMI generating devices.

15. The method of claim 14, wherein the test function is Test Mode A.

16. A method of generating net EMI from a system, comprising:

generating EMI from multiple EMI generating devices, wherein the EMI generated by each EMI generating device of the multiple EMI generating devices is substantially similar, wherein each EMI generating device is a cellular handset; and combining the EMI generated by each EMI generating device of the multiple EMI generating devices to produce net EMI, wherein the net EMI is a higher level of EMI than the EMI produced by each EMI generating device.

17. The method of claim 16, wherein the net EMI varies substantially linearly with the number of EMI generating devices.

18. The method of claim 16, wherein each cellular handset includes a SIM card that contains substantially identical data as SIM cards of the other cellular handsets.

19. The method of claim 16, wherein generating EMI from multiple EMI generating devices includes running a test function simultaneously on each of the multiple EMI generating devices.

* * * * *